Aug. 12, 1958  G. H. DAHL  2,846,824
CROSS-CUTTING DEVICE
Filed Dec. 23, 1953  6 Sheets-Sheet 1

Inventor
Grant Hansen Dahl
by
Paul H. Smoller
Attorney

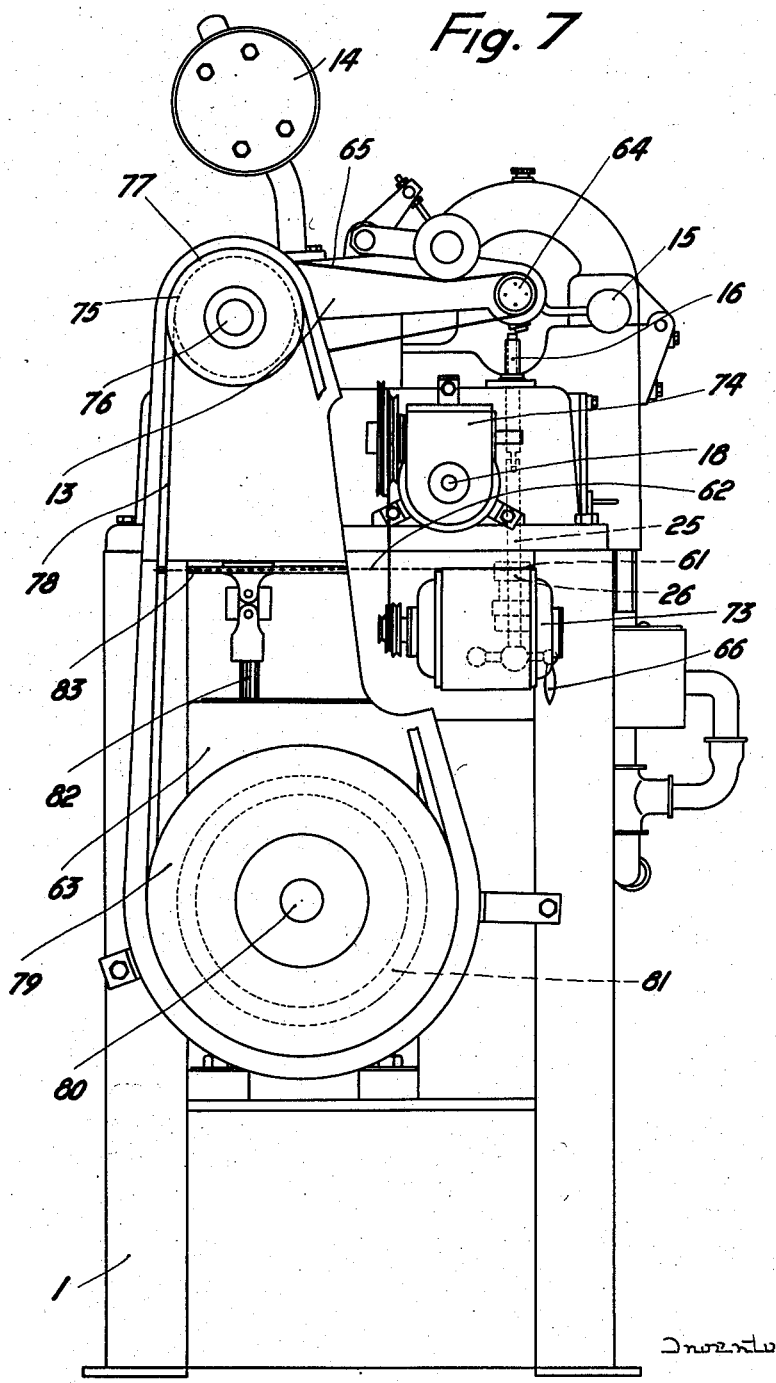

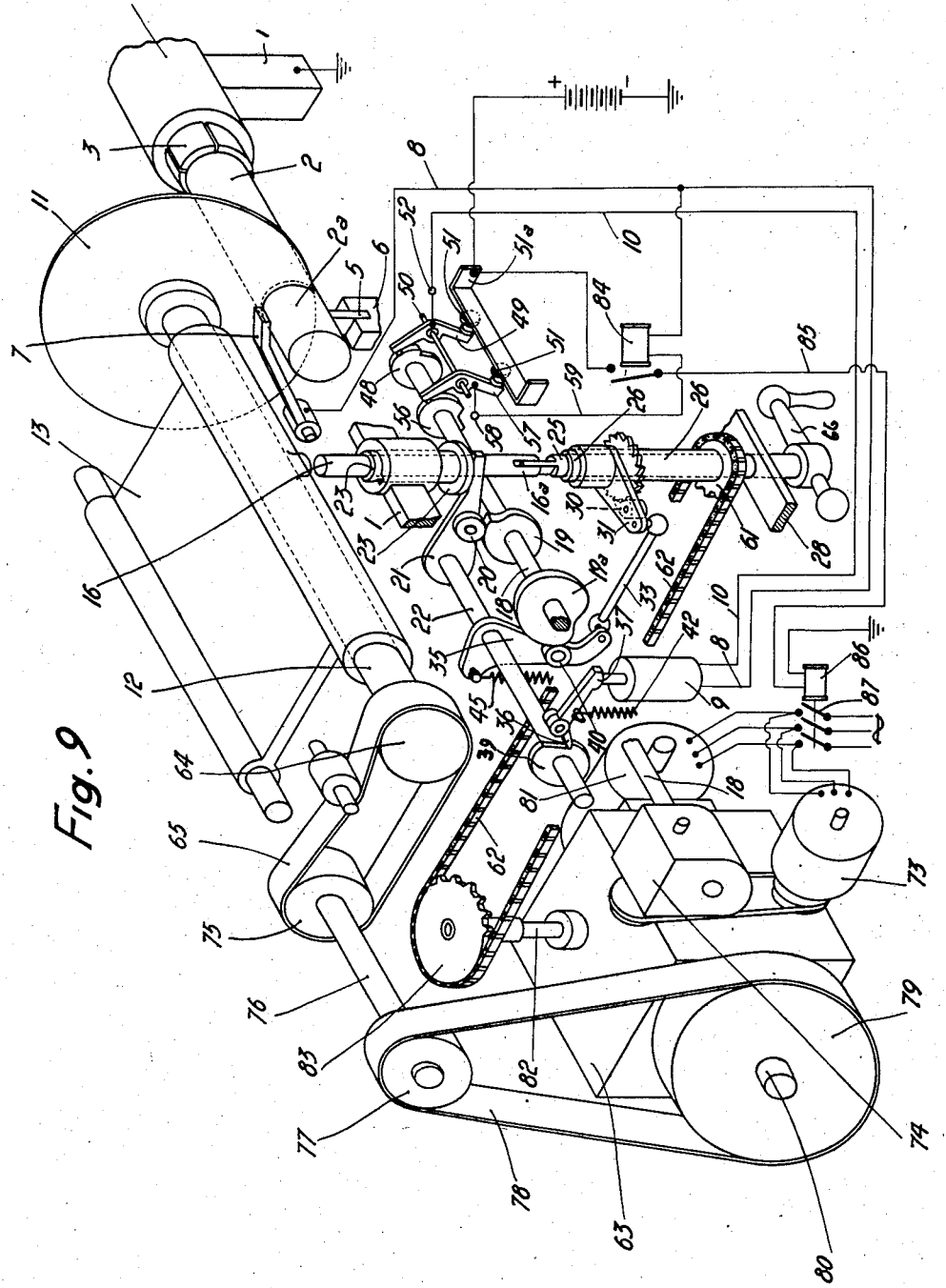

United States Patent Office 2,846,824
Patented Aug. 12, 1958

2,846,824

CROSS-CUTTING DEVICE

Groot Hansen Dahl, Saint-Cloud, France

Application December 23, 1953, Serial No. 400,006

Claims priority, application France December 30, 1952

4 Claims. (Cl. 51—98)

The present invention is relative to an automatic control device for the cross cutting of bars, for obtaining wafers, and more particularly for the cross cutting of metal bars, such as tungsten bars for instance, by means of cross-cutting grinders.

Such operations are generally effected by means of small grindstones of small thickness, rotating at a predetermined speed and the distance of which, to the bar which is being cross-cut, is to be corrected as the diameter of said grindstone decreases due to wear. While the distance to the bar, is thus corrected, the speed of rotation of the grindstone should also be simultaneously modified during the cross-cutting operation so as to preserve, for the latter, a constant linear speed.

An object of the present invention is to automatically compensate the wear of such a grindstone during cross-cutting operations, by moving it closer to the bar, which is being cross cut, in synchronism with an automatic control of the speed variation of said grindstone, so that the rotation of the grindstone increases as its diameter decreases.

An object of the present invention is an electro-mechanical device making it possible to achieve this result.

The advantage of such a device over purely mechanical devices is that it makes it possible to disregard the quality and the life of the grindstone. The wear of a grindstone increases in proportion to its decrease in diameter, a new grindstone approximately requiring a correction every ten cuts while a fairly worn grindstone requires a correction every two or three cuts. With an electric device, this correction is effected continuously.

The present invention is described in greater detail hereinafter with reference to the appended drawings, illustrating an example of embodiment of the machine and wherein:

Fig. 7 is an outer profile view of the machine, from opposite the feeding device of the bar.

Fig. 9 shows a perspective view of the new machine.

Figure 1:
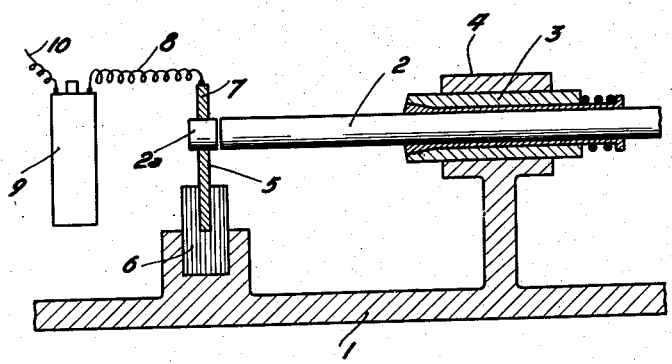
Fig. 1 is a sectional partly diagrammatical view of the position of a cross-cut bar.
Figure 2:
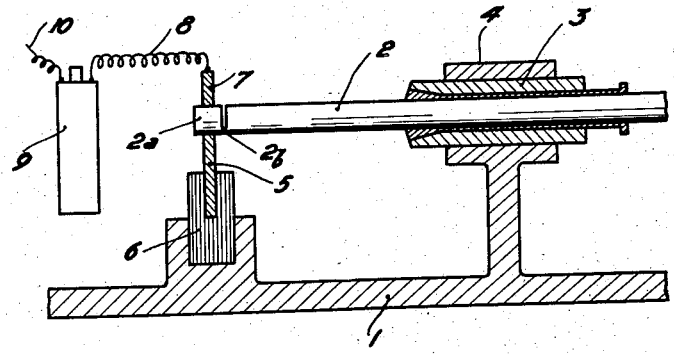
Fig. 2 is a view, identical to that of Fig. 1, the cross-cutting operation not having reached its end.

As shown in the drawings, the device according to the present invention consists of a rigid metal framework 1, supporting a metal bar 2 held in a chuck 3 of any known type and not shown in detail in the drawing, capable of sliding horizontally with respect to said framework in its support 4.

A device, not shown in the drawing, controls the automatic advance of the chuck 3 after each cut of a wafer, according to the length of the portion of the bar to be cut, this advance being effected, in the case of Figure 1, towards the left.

The portion 2a of the bar to be cross-cut is held in a mechanism consisting of a support 5, electrically insulated from the frame in a part 6 made of insulating material, associated with the frame in any known manner and not illustrated in detail in the drawing, and of a lever 7 of electrically conducting material which maintains the portion 2a against the support 5. The lever 7 bears a connection 8 to one end of the winding of an electro-magnet 9, the other end of which is connected through a conductor 10 and a switch which will be mentioned later, with one of the poles of a direct current source, not shown, the other pole of which is connected to the frame of the machine.

The cross cutting grinding wheel 11 is associated with a spindle 12, rotating inside a grinding wheel holder 13 provided with a counter-weight 14 and a handle 15, the counter-weight being so designed that the grinding wheel holder rests on the upper end of a screw 16 which will be dealt with later.

The mechanical elements controlling the displacement of the vertical run of the grinding wheel comprise a casing 17 inside which an axle 18 can turn, carrying a cam 19 actuating a roller 20 carried by a lever 21 and pivoted freely on an axle 22 and the end of which controls the vertical displacement of a socket 23 slidingly mounted in the casing 17 and the inner tapping of which cooperates with the threading of a screw 16. The socket is provided with a key 24 which cancels any axial rotating motion in the casing.

The rotation of the screw 16 is controlled, at its lower end 16a, by screw 25, the upper portion of which, in the shape of a screw driver 25a, can slide vertically in the portion 16a.

The screw 25 is controlled in rotation by the ratchet socket 26 and key 27, the threading of this screw cooperating with the inner tapping of a support or nut 28 associated with the frame by means of a screw 29.

Figure 5:
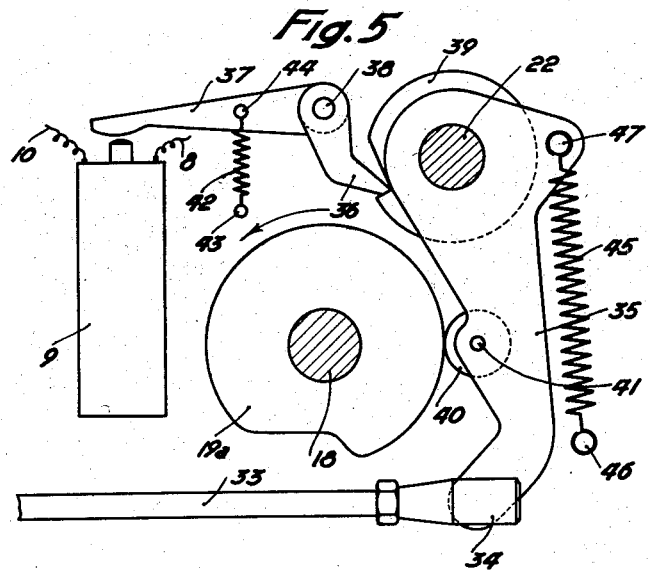
Fig. 5 is a view through line V—V of Fig. 3.

A pawl 30, carried by a lever 31, pivoted about the ratchet socket 26, cooperates with said ratchet socket. The end of the lever 31 is associated, by means of an attachment nut 31' with a ball and socket joint 32, connected through a rod 33 with another ball and socket joint 34, associated (see Fig. 5) with a lever 35 pivoted at 22 and held in a stand-by position by a pawl 36 associated with the lever 37 pivoted at 38, said pawl being applied against the notched disc 39 associated with the lever 35. Lever 35 carries a roller 40, pivoted at 41. A traction spring 42 is hooked to the frame at 43 and to the lever 37 at 44, a spring 45 being hooked at 46 to the frame and at 47 to the lever 35.

Figure 3:
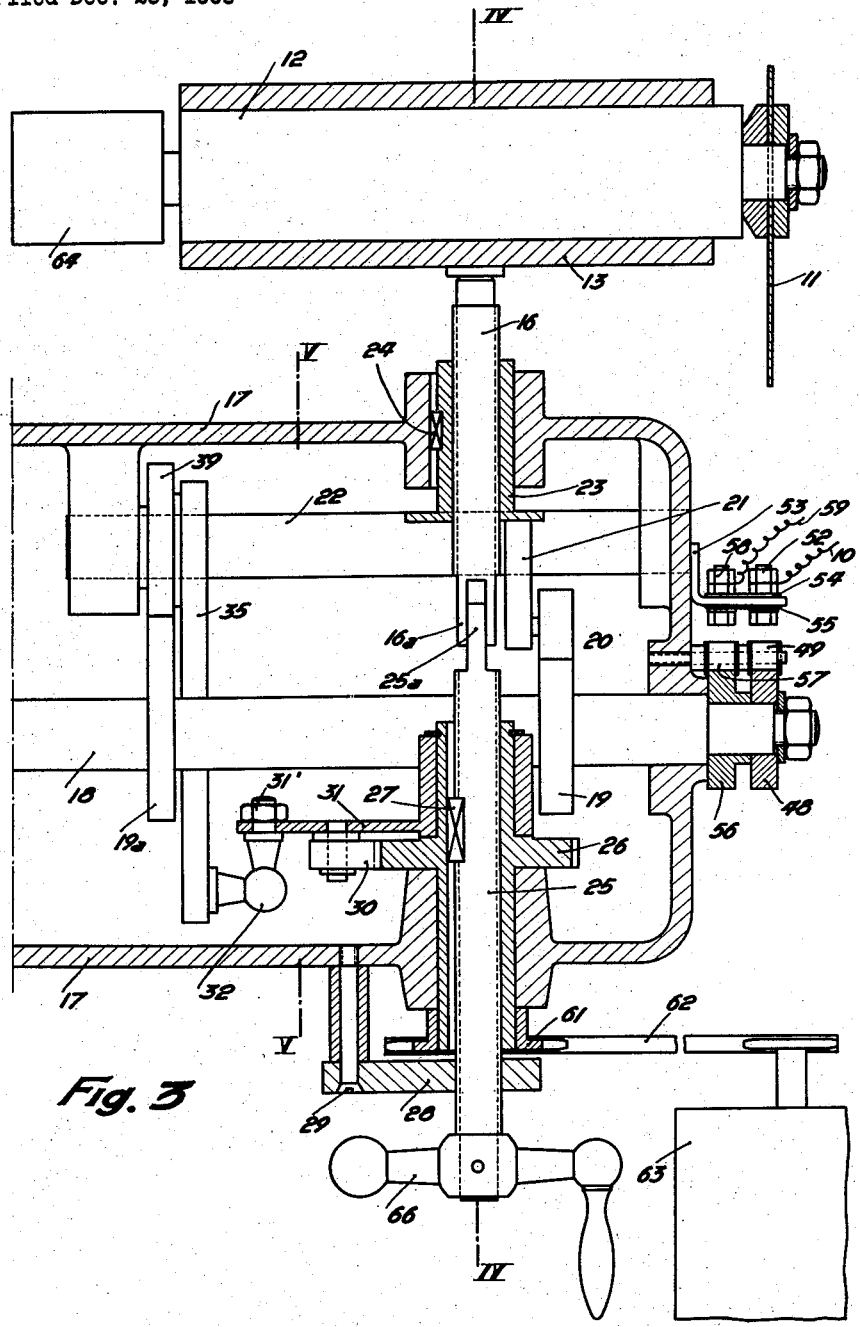
Fig. 3 is a sectional, elevational view of the control device for correcting the grind wheel in position and in speed.
Figure 4:
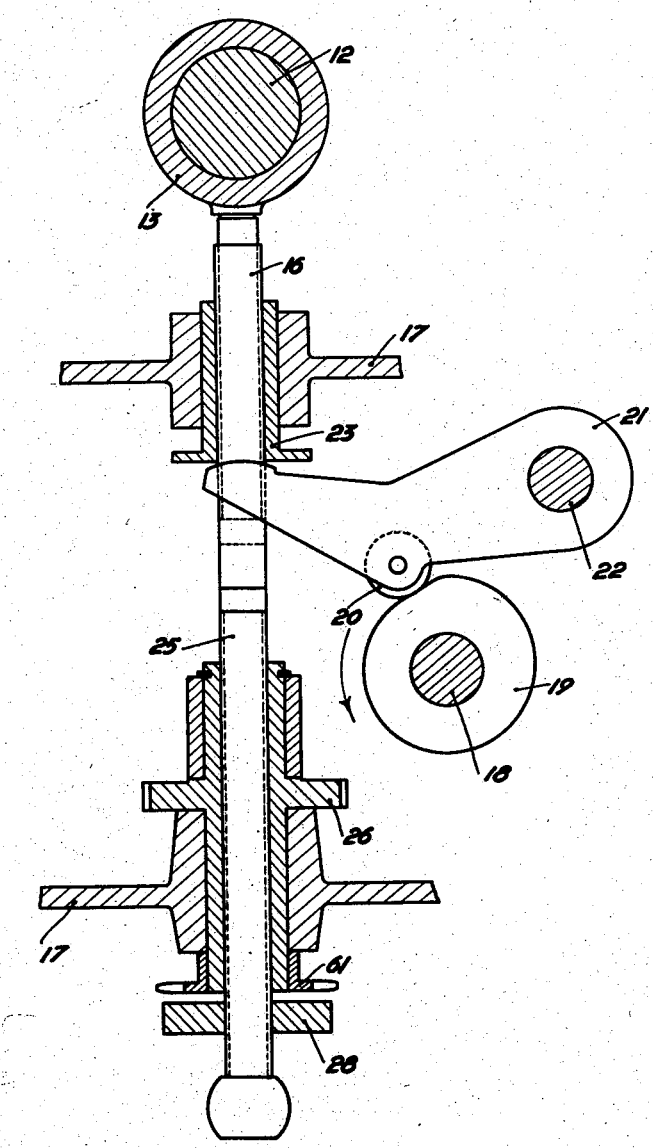
Fig. 4 is a view through line IV—IV of Fig. 3.
Figure 6:
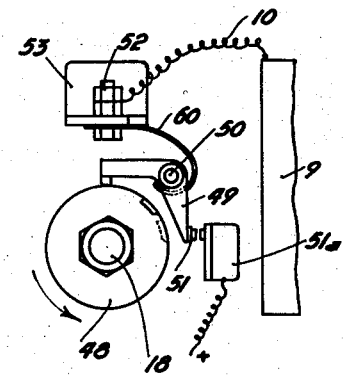
Fig. 6 is a frontward view of the switch, the winding of the electro-magnet being partly removed.

The switch connecting the coil 9 with one pole of a direct current source consists (see Figs. 3 and 6) in a cam 48, associated with the axle 18 and controlling a contact carrying lever 49, pivoted on an axle 50, electrically insulated from the frame, contact 51 of the contact holder being connected with an insulated terminal 52, associated with the frame by means of the angle iron 53, with the interposition of insulating plates 54 and 55 and of an insulating bushing, not shown in the drawing. Terminal 52 is connected with the conductor 10 of coil 9. Similarly, a cam 56 mounted in an identical manner, controls a contact holder 57, connected in an identical manner with a terminal 58 connected with a conductor 59, connected with a second coil 84 and the function of which will be explained hereinafter. A spring 60 maintains contact 51 against bar 51a, connected with the positive terminal of a direct current source. Further, the ratchet socket 26 is associated, at its lower portion, with a pinion 61 for driving a chain 62 controlling a speed variator 63 of any known type, for the rotation of the grinding wheel 11 driven in this motion by pulley 64 and belt 65 (Fig. 7).

Screw 25 is associated, at its lower end, with a crank 66 and a second cam 19a is associated with the axle 18.

The shaft 18 is rotated by an auxiliary electric motor 73 over a speed reductor 74. The shaft 12 of the grinding wheel 11 is rotated by the spindle 64 and the belt 65.

The belt 65 is driven by a pulley 75 mounted upon the shaft 76 which supports another pulley 77. This pulley 77 cooperates by means of the belt 78 with the pulley 79 mounted upon the end shaft 80 of the speed variator 63 which is controlled by the shaft 82. A chain wheel 83 mounted upon said shaft 82 cooperates by means of the chain 62 with the pinion 61 which is integral with the ratchet socket 26. The entrance shaft of the speed variator 63 is connected to the shaft of the electromotor 31 mounted upon the wheel box of the speed variator 63 and is controlled by the circuit breaker 87 actuated by the coil 86. The said circuit breaker 87 controls also an auxiliary electromotor 73 which drives over a speed controller 74 the shaft 18 with its cams 48, 56, 19, and 19a.

The cam 19a cooperates with the roller 40 of the lever 35 to initiate the rotation of the ratchet socket 26 and the progressive ascent of the screw 25. This screw is provided at its lower end with a crank 66 to permit a manual regulation of the top of the screw 16 relative to the swing holder 13 of the grinding wheel 11.

The coil 86 of the circuit breaker 87 is electrically connected by the wire 85 with the moving contact of the relay 84 the coil of which is connected by the wire 59 and the clamp 58 with the contact 57 and also over the wire 8 with the lever 7.

The operation of the machine will be easily understood from the following description, when read with Fig. 9 and the other figures of the drawing.

Suppose that the metal bar 2 which is intermittently displaced by the chuck 3 by means known in the art, has already been several times cut through and that another piece 2a is almost cut off from the bar 2. At this moment the cutting wheel 11 is being rotated by its shaft 12 by means of pulley 64, belt 65, pulley 75, shaft 76, pulley 77, belt 78, pulley 79, shaft 80, speed variator 63 and electromotor 81.

As it has been supposed that the cutting wheel 11 has cut off a number of pieces 2a from the bar 2 said wheel 11 has suffered a certain wear resulting in a reduction of its outer diameter.

While the shaft 12 is being rotated the shaft 18 with its cams 19, 19a, 48 and 56 is driven by the auxiliary electromotor 73 over the speed controller 74. The said cams are shaped to ensure the working cycle of the cutting wheel 11; thus the cam 48 effects the closing of the contact 49—51 when the cutting wheel 11 reaches the lowest position permitted by the screw 16 which limits the descent of the swing support 13 of the shaft 12 of said cutting wheel.

When therefore the diameter of the cutting wheel 11 has been reduced so that the bar 2 is not completely cut through at the time the contact 49—51 closes, an electric circuit passes through said contact 49—51, its frame 51a, electromagnet 9, wire 8, lever 7, the bar 2, its not completely cut off piece 2a, and the frame of the machine. Thus the electromagnet 9 is excited and the lever 37 is repulsed and disengages the pawl 36 from the cam 39 against the force of the spring 42 unlocking the shaft 22 from said pawl. When the recess of the cam 19a is in front of the roller 40 of lever 35 the latter under the force of the spring 45 follows the movement of said cam and by means of rod 33, lever 31, and pawl 30 which engages the ratchet gear of ratchet socket 26, effects the rotation of said ratchet socket by one tooth as soon as the hump of cam 19a repulses the said roller 40. At the same time the ratchet socket 26 displaces the lower screw 25 by means of the key 27 mounted in said socket and said screw 25. The thus driven screw 25 is displaced in the support or nut 28 and descends in a predetermined degree carrying the upper screw 16 to which it is coupled by the coupling 16a. The screw 16 turns in the nut 23 and descends also at the same degree permitting the swing support 13 to descend as well. The said succeeding operations are regulated by the cam 19a during the lifting of the cutting wheel 11 which is effected by the cam 19 acting upon lever 21 which supports the gliding sleeve 23. Thus the displacement of the screw 16 will not become effective until in the following cycle.

Simultaneously the rotating socket 26 causes the pinion 61 to rotate, and the same by means of chain 62 and wheel 83 drives the control shaft 82 of the speed variator 63 increasing the drive speed of the cutting wheel 11 at a predetermined degree in conformity with its wearing off in order to maintain its substantially uniform circumferential speed and its best effectiveness.

Coincidentally the rotating cam 56 upon shaft 18 cooperating with the lever of contact 57 causes the closing of the contact 57—51 establishing a circuit over clamp 58, wire 59 and winding of relay 84. The said cam 56 is wedged to the shaft 18 so that the said circuit is closed when the cutting wheel 11 returns into its elevated position.

If the bar 2 has not been cut through for any reason, for example if the cutting wheel should break, the aforesaid circuit passes through the winding of relay 84, the wire 8, the lever 7, the partially cut off bar piece 2a, the bar 2 and the frame of the machine. The said relay 84 is thus actuated and closes a circuit through the contact frame 51a, the contacts of relay 84, the wire 85, the relay 86 and the machine frame. Said relay 86 then actuates the circuit breaker 87 stopping the electromotor 81 driving the cutting wheel 11 and the auxiliary electromotor 73 driving the shaft 18.

If the bar 2 has been properly cut through the coil 9 is not excited after the roller 40 passed the recess of the cam 19a and the ratchet socket 26 is not rotated. The descending movement of the cutting wheel 11 continues and the speed variator is not actuated. Also the circuit controlled by the cam 57 is not being closed and the electromotors 81 and 73 continue to operate.

In case the bar has been cut, no current flows through coil 9 when the recess of cam 19a passes in front of roller 40 and socket 26 is not driven in rotation. The run of the grinding wheel is not displaced downwards and the speed variator is not actuated.

Similarly, the circuit controlled by cam 57 does not close and the grinding wheel motor keeps operating.

When the grinding wheel is completely worn out and the offsetting of its reciprocating run downwards is maximum, the grinding wheel carrier is brought back to its highest starting point by means of crank 66. The grinding wheel is then changed and the device is ready for operating again as described above.

Figure 8:
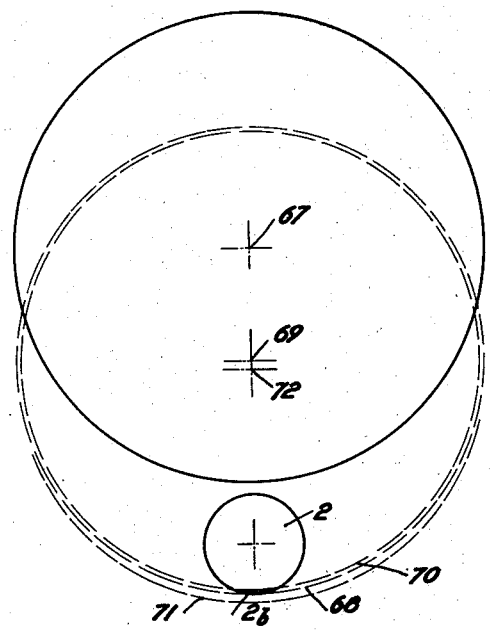
Fig. 8 is an explanatory diagram of the operation of the automatic control device according to the various positions of the grinding wheel.

In Fig. 8, which shows various positions of the grinding wheel with respect to the bar to be cut, the starting position may be seen for a new grinding wheel at 67, then the position of this same wheel at the point of impulse at 68 centered at 69 i. e. at the point of closure of the contact 51.

In this position, it will be seen that the bar is entirely cut, the correcting device is not released, since the electric circuit cannot be closed due to the fact that the bar is interrupted.

At 70, the grinding wheel which is axled at 69 and which has undergone a certain wear has reached the point of impulse before the bar has been entirely cut through. The circuit closes through 2b and starts the correcting system. During this time, the grinding wheel goes through its run up to its extreme position downwards, i. e. position 71 axled at 72. When the grinding wheel moves up, pawl 30, being in an active position, actuates screws 25 and 16 by means of the ratchet socket 26 and moves them down by the desired amount.

What I claim is:

1. A machine for cross-cutting metal bars or the like by means of a rotatable cutting disc, comprising a machine frame; a spindle for said cutting disc; an electric motor driving said spindle; a holder rotatably supporting said spindle in said frame and displaceable in a direction substantially perpendicular to the rotational axis of said spindle between two adjustable predetermined end positions; a socket mounted unrotatably but slidably in longitudinal direction in said frame; a threaded shaft engaging said socket, the upper end face of said shaft contactively supporting said holder; an auxiliary shaft rotatably mounted in said frame parallel to said spindle; first means actuated by said auxiliary shaft to reciprocatively displace said socket with the engaging threaded shaft and thereby said holder; driver means for turning said threaded shaft into said socket; electromagnetic means to control said driver means; the metal bar to be cut through adapted to carry the electric current for said driver means; and second means actuated by said auxiliary shaft to excite electrically said electromagnetic means when the metal bar is not completely cut through, thus causing the actuated driver means to turn said threaded shaft into said socket and lowering the predetermined lower end position of the reciprocating holder to correct the wear of the cutting disc.

2. A machine according to claim 1 comprising a speed variator associated with said motor driving the spindle of said cutting disc, and driving means interconnecting said driver means for said threaded shaft and said speed variator in order to control the latter.

3. A machine according to claim 1 wherein said first means reciprocatively displacing said socket and said holder comprise a control cam keyed on said auxiliary shaft; a lever keyed at one end to the frame of the machine and actuated by said control cam; the other end of said lever acting upon said socket to displace the same in axial direction thereof; and said threaded shaft consisting of two engaging parts permitting the shaft to extend longitudinally when said socket is lifted by said lever.

4. A machine according to claim 1 wherein the said threaded shaft is provided with manually operated means actuating the spindle to adjust the position of said holder.

References Cited in the file of this patent

UNITED STATES PATENTS

| | | |
|---|---|---|
| 2,388,434 | Phillis | Nov. 6, 1945 |
| 2,511,563 | Bullard | June 13, 1950 |

FOREIGN PATENTS

| | | |
|---|---|---|
| 655,574 | France | Dec. 18, 1928 |